R. PENTLAND.
PERPETUAL CALENDAR.
APPLICATION FILED DEC. 3, 1919.
1,348,044.
Patented July 27, 1920.
2 SHEETS—SHEET 1.
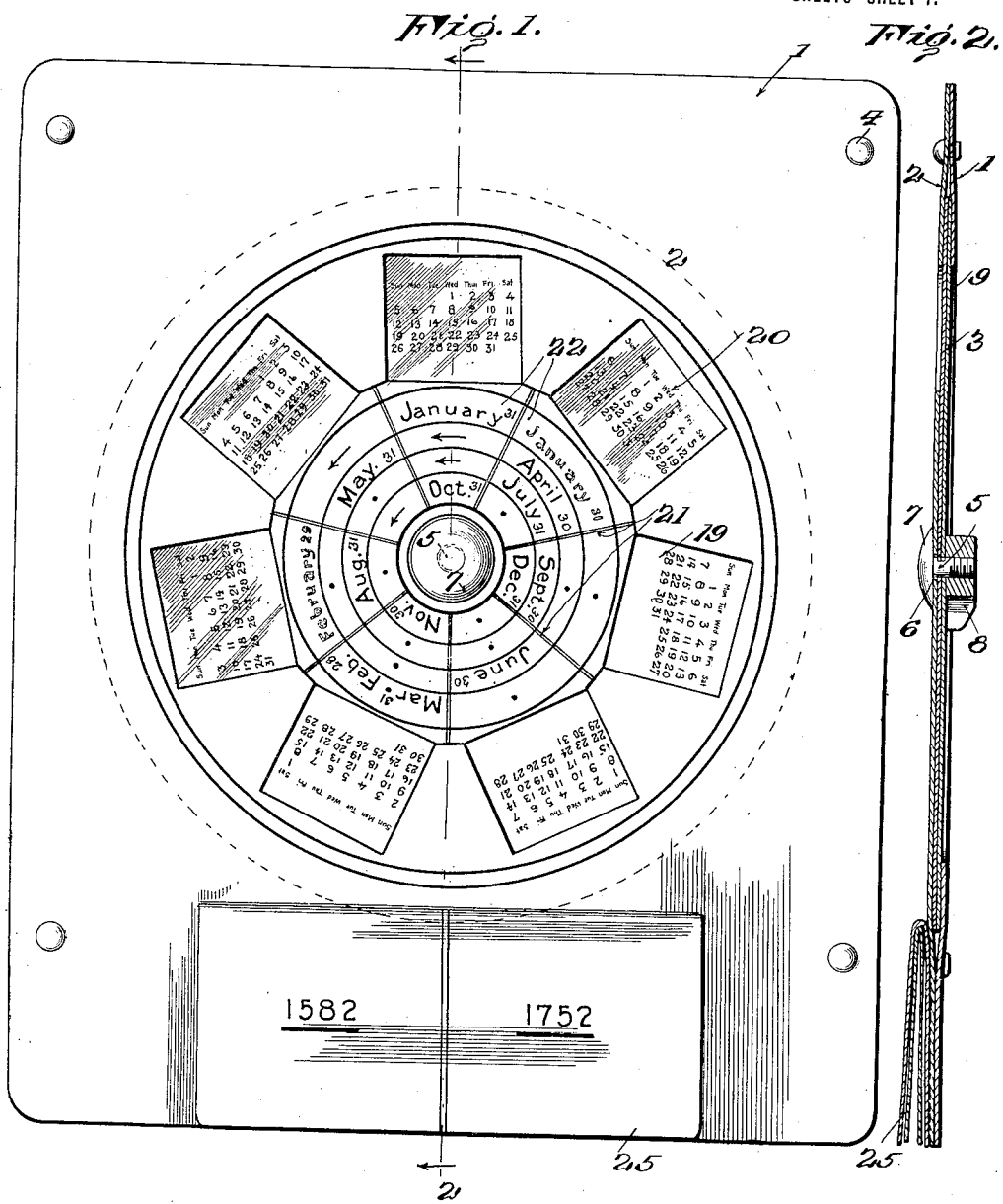
Inventor.
R. Pentland.
by
Lacey & Lacey, his Att'ys Inventor.
R. Pentland.

by Lacey & Lacey, his Atty's

UNITED STATES PATENT OFFICE.

ROBERT PENTLAND, OF JACKSONVILLE, FLORIDA.

PERPETUAL CALENDAR.

1,348,044.  Specification of Letters Patent.  Patented July 27, 1920.

Application filed December 3, 1919. Serial No. 342,074.

*To all whom it may concern:*

Be it known that I, ROBERT PENTLAND, a citizen of the United States, residing at Jacksonville, in the county of Duval and State of Florida, have invented certain new and useful Improvements in Perpetual Calendars, of which the following is a specification.

This invention relates to perpetual calendars and has as its primary object to provide a device which may be manipulated so as to instantly produce a complete calendar for any year, past, present, or future and which yearly calendar will in all cases be an accurate one for the year selected.

I am aware of the fact that various kinds of perpetual calendars have been placed upon the market or have been revised or suggested, but I have as yet failed to find any other than the calendar of the present invention, which will give absolutely accurate readings for all past years. As is well-known to those familiar with the subject the old Julian calendar was, through the efforts of Gregory XIII corrected October 4, 1582, this corrected calendar being adopted by Italy, France, Spain and practically all other Catholic countries. It was not, however, until September 2, 1752 that a corrected form of the Julian calendar was adopted by the generally accepted non-Catholic countries, the change being made by Great Britain on that date, and the calendar as thus corrected being the one now in use in all English speaking countries. This change involved the omission from the calendar of eleven days. I have found that previously devised so called perpetual calendars do not accurately compensate for this loss of time so that in attempting to obtain month or week dates prior to 1753, accurate results cannot be obtained. Therefore, it is another object of the present invention to compensate for the corrections made in the calendar so that accurate results may be obtained for any year past, or a current year or a future year.

I have also observed that in practically all calendars of this general class heretofore devised, it has been necessary to manipulate a plurality of movable members and even to mentally calculate certain results which must be employed in the manipulation of the members. The invention therefore has as a further object to provide a calendar the movable part of which may be readily and quickly manipulated or adjusted so as to obtain the calendar for any year and without the necessity of repeated manipulations of the movable member and of calculating any results which are to be employed as a guide in the movement or adjustment of the member.

In the accompanying drawings:

Figure 1 is a view looking at one face of the calendar embodying the present invention;

Fig. 2 is a vertical sectional view on the line 2—2 of Fig. 1;

Figures 3, 4:
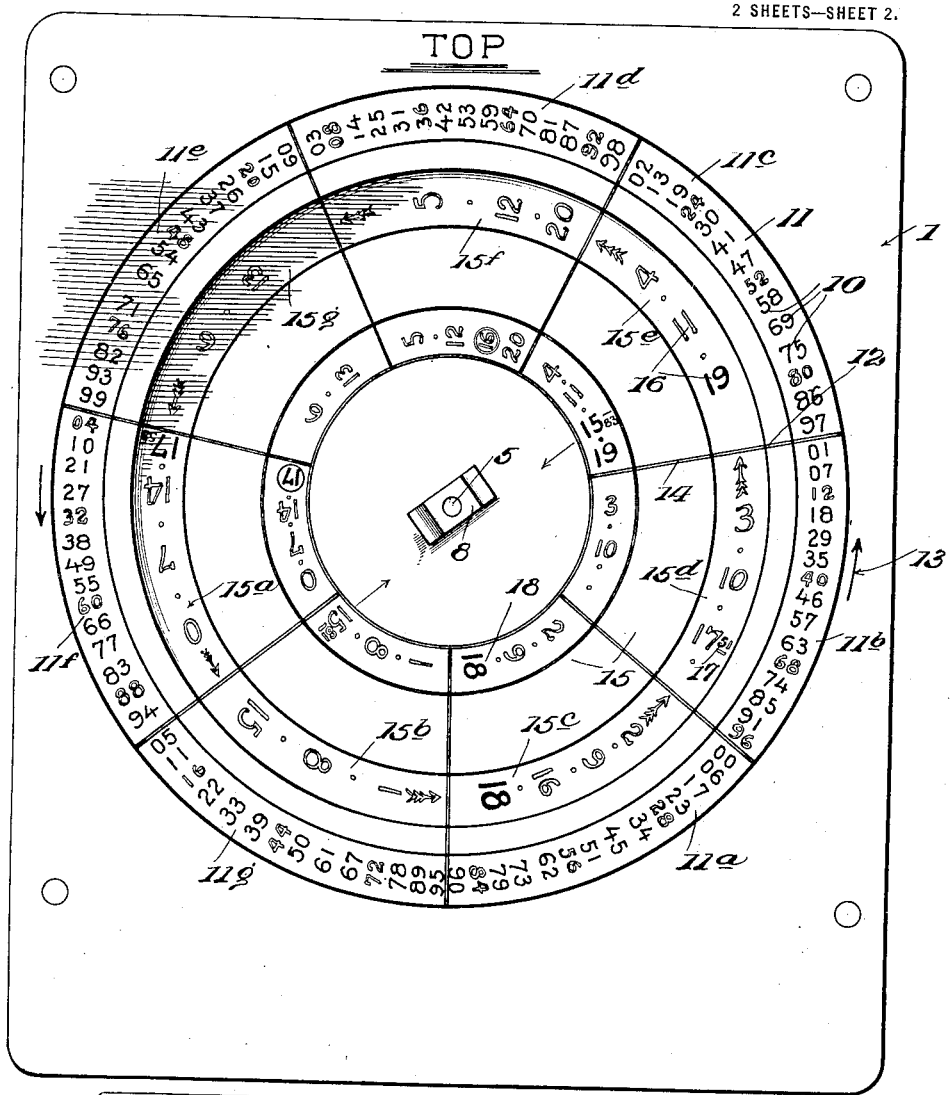
Fig. 3 is a view similar to Fig. 1 looking at the opposite face of the calendar.
Fig. 4 is a view of complete calendars for the years 1582 and 1752 showing the corrections made in the Julian calendar in these years.

So far as its mechanical construction is concerned, the calendar embodying the invention comprises two face plates or sheets which may be of metal, celluloid, cardboard, or any other material suitable for the purpose and one of which is indicated by the numeral 1 and the other by the numeral 2, and a rotatable disk which is indicated by the numeral 3 and which may likewise be of any of the above mentioned materials or any other material suitable for the purpose and which is mounted between the plates 1 and 2. The disk 3 may be of single or of double ply construction and the same is of general circular form as illustrated by the dotted lines in Fig. 1 of the drawings, whereas the plates 1 and 2 are preferably rectangular and have their margins secured together in any suitable manner as for example by rivets or other suitable fastening elements 4 which may be located at or adjacent the corners of the plate or at any other convenient points. In order to rotatably mount the disk 3 between the plates 1 and 2, a pivot 5 or any other suitable device may be employed, the pivot in the present instance having its shank rotatably fitted through an opening 6 formed in the plate 2 and being provided with a substantially flat head 7 which contacts the face of this plate. The shank of the pivot may be threaded and the same has fitted or secured thereto a turn-button indicated by the numeral 8 which may be grasped for the purpose of rotating the pivot, the disk 3 being fixed in any suitable manner for rotation with the said pivot.

The plate 1 is provided with a circular opening 9 concentric to the pivot 5, and upon the face of this plate surrounding and concentric to the opening there is printed an annular series of ordinals indicated by the numeral 10, the series being divided into a plurality of sectors 11 by lines 12 which are radial to the pivot 5. One or more arrows 13 at the margin of the series of numerals 10 indicates the direction in which the numerals or ordinals are arranged in ascending order. There are seven of the sectors 11 and as a matter of convenience these sectors are indicated by the reference characaters $11^a$, $11^b$, $11^c$, $11^d$, $11^e$, $11^f$, and $11^g$. If reference is now had to Fig. 3 it will be observed that taking any year or ordinal, the ordinal designating the succeeding year will be found in the next adjacent sector proceeding in the direction indicated by the arrow 13 or, in other words, in an anti-clockwise direction with the exception that upon the occurrence of a leap year, the one sector will be skipped. Thus, for example, the year ordinal "17" which may represent the year "17" of the first century or the seventeenth year of any other century, is found in the sector $11^a$; the ordinal "18" representing the eighteenth year of the first or any other century is found in the sector $11^b$, and the year ordinal "19" is found in the sector $11^c$. However, as the twentieth year of any century is a leap year, the year ordinal "20" will not be found in the next sector $11^d$ but in the sector $11^e$. Thus the next year ordinal "21" will be found in the sector $11^f$, the year ordinal "22" in the sector $11^g$, and the year ordinal "23" in the sector $11^a$ but the year ordinal "24," representing a leap year will not be found in the sector $11^b$ but in the sector $11^c$. In practice the year ordinals representing leap years will be printed in some distinguishing color or type so that they will not be confused with the year ordinals representing ordinary years and this method of distinction is clearly illustrated in the said Fig. 3. It will now be apparent that beginning with the year ordinal "00" in the sector $11^a$, the year ordinals are consecutively arranged in numerical order in an anti-clockwise direction, succeeding year ordinals being located in next adjacent sectors in the direction stated except in the instance of the year ordinals representing leap years which are separated from the preceding year ordinal by a skipped sector. Also it will be evident that while the year ordinals are arranged in sectors defined by radial lines 12, they may as a matter of fact be considered as arranged in groups.

One face of the disk 3, which face is exposed within the opening 9 in the plate 1, is divided by radial lines 14 into sectors 15 corresponding in number to the sectors 11, and printed in an annular series upon the face of the said disk and divided into groups by the lines forming the sectors, are ordinals 16 representing centurial years. As a matter of convenience the sectors 15 are severally indicated by the numerals $15^a$, $15^b$, $15^c$, $15^d$, $15^e$, $15^f$ and $15^g$. The centurial year ordinals 16 beginning with "0" in the sector $15^a$ are arranged in numerical order throughout successive sectors in an anti-clockwise direction and while in the illustrated embodiment of the invention the highest centurial year ordinal is "20," it will be understood that the calendar may be given an unlimited range by extending the series of these ordinals to any extent desired. In the illustrated arrangement, beginning with the centurial year ordinal "0" in the sector $15^a$, we find the centurial year ordinal "1" in the sector $15^b$, the centurial year ordinal "2" in the sector $15^c$, and so on in numerical order throughout the series of sectors in an anti-clockwise direction until we reach the centurial year ordinal "17" in the sector $15^d$. As the calendar was changed in 1752, the centurial year ordinal "17" in the said sector $15^d$ is supplemented by the annual year ordinal 51 as indicated by the numeral 17 so as to recall to the user of the calendar the fact that the arrangement of centurial year ordinals in successive sectors holds good up to and through the year 1751 but if it is desired to find any date or obtain the year calendar for the year 1753 or any subsequent year in the eighteenth century, it will be necessary to have reference to the sector $15^a$ in which appears another centurial year ordinal "17" with a supplemental annual ordinal 53 preferably in a color distinguishing it from the centurial year ordinal "17" in the sector $15^d$.

At this point it may be stated that in the use of the calendar any complete year ordinal may be produced by rotating the disk 3 to such position as to register the particular sector 15 containing the centurial year ordinal with the sector 11 containing the required annual ordinal. Thus for example if it was desired to produce the complete ordinal of the present year 1919, the disk would be rotated to such position that the sector $15^e$ containing the centurial year ordinal "19" registers with the sector $11^c$ containing the annual ordinal "19." To obtain the complete year ordinal 1920, the disk would be rotated so as to bring the sector $15^e$ not into registration with the sector $11^d$ but into registration with the sector $11^e$, this particular year being a leap year.

The centurial year ordinals comprising the series 16 are to be employed in calculating all dates by the calendar as revised by Great Britain September 2, 1752, but in order that the present calendar may be employed likewise in calculating dates by the calendar as corrected by Gregory XIII on October 4, 1582, a second annular series of centurial year ordinals, indicated by the numeral 18 is printed upon the face of the disk 3 within the bounds of and concentric to the series 16 and is divided into groups or sectors by the radial division lines 14. The arrangement of the ordinals of the series 18 is similar to that of the ordinals of the series 16, the former ranging from "0" to "15" with the supplemental annual ordinal "81" and then from 15 with the supplemental annual ordinal "83" to the ordinal "20."

The plate 2 is provided with a series of rectangular openings 19, the series being concentric to the pivot 5, and the disk 3 has printed upon its face which is presented to the said plate 2, seven complete monthly calendars the day ordinals of which are arranged consecutively in transversely extending week rows and in vertical day columns as in the ordinary types of monthly calendars now in general use and each of these calendars, indicated by the numeral 20 embraces thirty-one month dates and the arrangement is such that in one of the calendars the first day of the month will appear in the day column headed by the day abbreviation "Sun."; the first day of the month in the next month calendar in the series in an anti-clockwise direction will appear in the day column headed by the abbreviation "Mon.", and so on throughout the series. Radial lines 21 divide the space surrounded by the series of openings 19, into a plurality of sectors 22, in each of which there is printed one or more month names or their abbreviations. Thus in one sector we have the month names January and October, in the next adjacent sector in a clockwise direction, the month names January, April and July; in the next sector the month names September and December; in the next June; in the next March, February and November; in the next February and August, and in the remaining one May. It will be observed that January appears in two other sectors as does also February, and this is done in order to compensate for leap years, and to this end the word January appearing in the sector containing also the month names April and July will appear in some distinguishing color as for example red, and likewise February appearing in the sector with August and printed in a distinguishing color.

It will now be evident that upon rotating the disk 3 to cause registration of the sectors 15 and 11 in order to produce any desired combination of centurial and annual years and thus form a given complete year ordinal, the monthly calendars or blocks 20 will be brought into position opposite certain respective ones of the openings 19 and the arrangement is such that for any year selected and composed through rotation of the disk 3, the correct calendar for that year will be produced upon the reverse face of the device and may be read by referring to the monthly calendars 20 in the order designated by the month names within the sectors 22. If the composed year is a leap year, then in referring to the monthly calendars for January and February, reference will be had to the calendars 20 opposite to the January and February names which appear respectively within the sectors with the April and July month names and the August month name.

For the years 1582 and 1752, a folding calendar may be provided for each year, the first being indicated by the numeral 23 and the second by the numeral 24 and these calendars may be housed within a folding cover 25 and arranged upon the face of the plate 1 in the manner clearly shown in Figs. 1 and 2 of the drawings, the calendars themselves being shown open or spread out in Fig. 4.

Instead of providing individual calendars for the years 1582 and 1752 of the construction above described and illustrated in the drawings, the calendars for these years may be printed directly upon the face of the sheet 2 for example or upon any other accessible portion of the article.

It is preferable that the month names in the spaces 22 be followed by individual numerals indicating the number of days in each respective month as clearly shown in Fig. 1 of the drawings. It will be observed by reference to this figure, furthermore that the months are arranged in chronological order reading in the direction indicated by the arrows in the said spaces 22 and a knowledge of this arrangement will, of course prove helpful in locating any particular month.

Having thus described the invention, what is claimed as new is:

1. In a perpetual calendar, members, one rotatable with relation to the other, one member bearing upon one face an annular series of year ordinals, the other member bearing an annular series of centurial year ordinals adapted to be selectively positioned in relation to the year ordinals of the first mentioned member in the rotation of one of the members with relation to the other, one of the said members bearing groups of month designations, and the other member bearing a plurality of monthly calendars adapted to be brought into juxtaposition with relation to the month designations through the rotation of one of the members with relation to the other.

2. In a perpetual calendar, a relatively fixed member bearing upon one face an annular series of year ordinals, and a member rotatable with relation to the first mentioned member and bearing an annular series of centurial year ordinals adapted to be selectively positioned in relation to the year ordinals of the first mentioned member, the said first mentioned member bearing groups of month designations, and a rotatable member bearing a plurality of monthly calendars adapted to be brought into juxtaposition with relation to the month designations through rotation of the second mentioned member.

3. In a perpetual calendar, a relatively fixed member bearing upon one face an annular series of year ordinals arranged in groups, and a member rotatable with relation to the first mentioned member and bearing an annular series of centurial year ordinals also arranged in groups, any group of the centurial year ordinals being adapted to be brought opposite any selected group of the first mentioned year ordinals upon rotation of the rotatable member, the said first mentioned member bearing groups of month designations, and the rotatable member bearing a plurality of monthly calendars adapted to be brought into juxtaposition with relation to the month designations through rotation of the second mentioned member.

4. In a perpetual calendar, members one rotatable with relation to the other, one of said members having an annular series of sectors each containing a series of year ordinals, the other member having an annular series of sectors each containing a series of centurial year ordinals, the sectors of one member being designed to be brought into selective registration with the sectors of the other member upon rotation of one of the said members with relation to the other, one of the members bearing month designations, and the other member bearing a plurality of monthly calendars both to be juxtapositioned through the rotation of one member with relation to the other.

5. In a perpetual calendar, a relatively fixed member bearing an annular series of year ordinals arranged in groups and ranging from "00" to "99" in numerical order with successive ordinals located in successive groups except in the instance of ordinals which represent leap years, at the occurrence of which one group is skipped for each of said ordinals, and a member rotatable with relation to the first mentioned member and bearing an annular series of centurial year ordinals arranged in groups which are to be brought selectively opposite the groups of the year ordinals first mentioned, in the rotation of the rotatable member, one of said members bearing groups of month designations, and the other member bearing a plurality of monthly calendars adapted to be brought into juxtaposition with relation to the month designations through rotation of the rotatable member.

6. In a perpetual calendar, a relatively fixed member bearing an annular series of year ordinals arranged in groups and ranging from "00" to "99" in numerical order with successive ordinals located in successive groups except in the instance of ordinals which represent leap years, at the occurrence of which one group is skipped for each of said ordinals, and a member rotatable with relation to the relatively fixed member and bearing an annular series of centurial year ordinals arranged in groups to be selectively brought into juxtaposition to the groups of year ordinals first mentioned, one of the ordinals in one of the last mentioned groups designating centurial years from 1700 to 1751 and another ordinal in another of said last mentioned groups designating centurial years from 1753 to 1799, one of said members bearing groups of month designations, and the other member bearing a plurality of monthly calendars adapted to be brought into juxtaposition with relation to the month designations through rotation of the rotatable member.

7. In a perpetual calendar, a relatively fixed member bearing an annular series of year ordinals arranged in groups and ranging from "00" to "99" in numerical order, successive ordinals appearing in successive groups except upon the occurrence of an ordinal designating a leap year when one group is skipped, a member rotatable with relation to the first mentioned member and bearing an annular series of centurial year numbers likewise arranged in groups to be brought into juxtaposition selectively to the first mentioned groups upon rotation of the rotatable member with relation to the fixed member, one of the centurial year numbers designating the years of a century prior to a change in the calendar made in said century, another one of the centurial year ordinals representing years subsequent to the year of such change, one of said members bearing groups of month designations, the other member bearing a plurality of monthly calendars adapted to be brought into juxtaposition with relation to the month designations through rotation of the rotatable member, and a complete calendar for the year of the change.

In testimony whereof I affix my signature.

ROBERT PENTLAND. [L. S.]